May 28, 1929.  H. S. CRAWFORD  1,714,769
TIRE INFLATION TESTING APPLIANCE
Filed Dec. 22, 1926
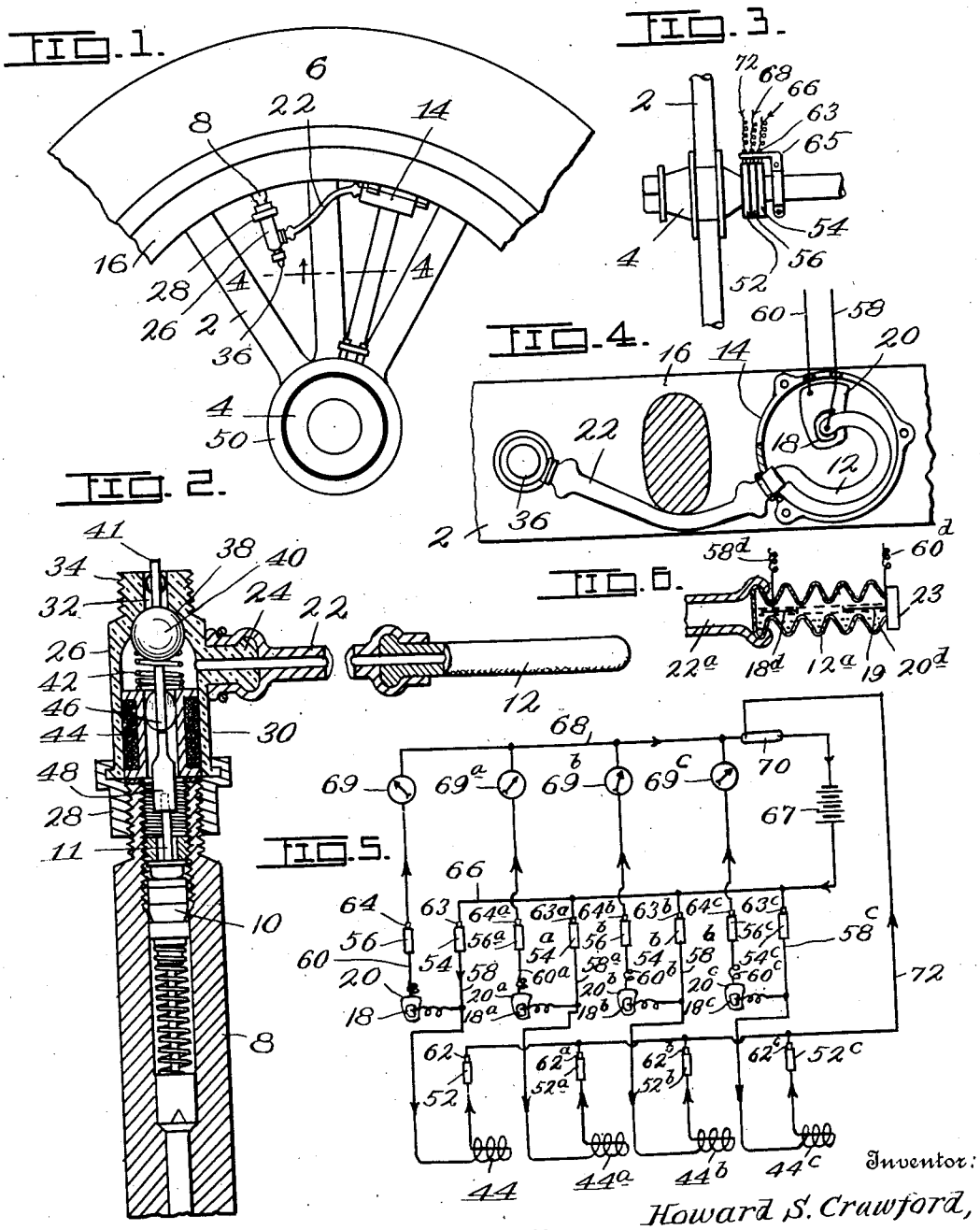
Inventor:
Howard S. Crawford,
By
F. G. Fischer
Attorney.
Witness:
Fred C. Fischer.

Patented May 28, 1929.

1,714,769

UNITED STATES PATENT OFFICE.

HOWARD S. CRAWFORD, OF KANSAS CITY, MISSOURI.

TIRE-INFLATION-TESTING APPLIANCE.

Application filed December 22, 1926. Serial No. 156,377.

My invention relates to an inflation testing appliance and one object is to provide means of this character which will accurately indicate different degrees of air pressure within a pneumatic tire.

Another object is to provide an appliance of this character which can be readily connected to the standard valves in use on automobiles tires and includes means which can be arranged upon the dash of the automobile for indicating the degree of air pressure within each tire.

Another object is to provide an appliance of this character with an electric circuit controllable from the driver's position.

A further object is to provide an appliance of this character which is reliable in operation and not likely to get out of order.

Other objects will hereinafter appear and in order that the invention may be fully understood, reference will now be had to the accompanying drawing, in which:

Fig. 1 is a fragmentary side elevation of a motor vehicle wheel equipped with certain elements of the invention.

Fig. 2 is an enlarged broken sectional view of a tire valve equipped with certain parts of the invention.

Fig. 3 is a fragmentary view of the wheel showing its hub equipped with certain elements of the invention.

Fig. 4 is an enlarged fragmentary section on line 4—4 of Fig. 1.

Fig. 5 is a diagrammatic view of the electric circuits employed in carrying out the invention.

Fig. 6 is a sectional view of a modified form of spring tube made of nonconducting material.

Referring in detail to the different parts disclosed by the drawing, 2 designates a motor vehicle wheel including a hub 4. 6 designates a pneumatic tire mounted upon the wheel 2 and provided with the customary valve structure 8, which communicates with the interior of the tire 6 and has the usual valve 10 for retaining air under pressure within said tire 6.

12 designates a spring tube preferably of the Bourdon type and responsive to variations in pressure within the tire 6. The major portion of the tube 12 is, for the purpose of protection against dust, mud and other foreign matter, enclosed within a case 14 which is secured to the felly 16 of the wheel 2. A variable resistance is associated with the spring tube 12 and consists of a contact 18 and a plate 20. The contact 18 is fixed to the free end of the tube 12 so that as said free end moves in response to pressure variations within the tire said contact will be carried back and forth over the plate 20 and thus vary the strength of an electric current flowing through said plate, as will hereinafter more fully appear. The outer or fixed end of the tube 12 is connected by a rubber or other suitable tube 22 to the nipple 24 of a valve structure 26 which is removably connected to the reduced threaded end of the valve stem 8 by a coupling 28.

The valve structure 26 includes a shell 30 having a passageway 32 for the passage of air to and from the tire 6 when the same is being inflated or deflated. Normally the reduced threaded end 34 of the shell 30 is closed against the admission of dust or other foreign matter by a removable screw cap 36 which may be the one usually accompanying the valve structure 8. The passageway 32 has a seat 38 for the accommodation of a valve 40 which is yieldably held against said seat by means of a coil spring 42 for preventing the escape of air to atmosphere when the valve 10 is opened to admit air to the spring tube 12. The valve 40 is provided with a stem 41 which projects outwardly through the passageway 32 to guide said valve 40 while the latter is being opened or closed and also to enable said valve to be readily opened for the admission of air to the tire 6 for the purpose of inflating the latter.

44 designates a solenoid secured within the shell 30 and provided with a core 46 having an insulated socket portion 48 fitting over the adjacent end of the stem 11 of the valve 10. One end of the solenoid coil is connected to a ring conductor 54, through a wire conductor 58, while the opposite end of said coil is connected to a ring conductor 52 secured in axial alinement with the ring 54 upon the hub 4.

56 designates another ring conductor which is secured upon the hub 4. The rings 52, 54 and 56 are insulated from each other and the hub 4, and the ring 54 is connected to the Bourdon tube contact 18 by means of the conductor 58, while the ring 56 is connected to one end of the plate 20 by a conductor 60.

62, 63 and 64 designate brushes bearing against the rings 52, 54 and 56, respectively, and supported by an arm 65 which is secured to a suitable portion of the motor vehicle.

Referring more particularly to the diagram Fig. 5, 66 designates a line having one end connected to the brush 63 and its opposite end connected to an electric source such as the battery 67 which may constitute a part of the regular electrical equipment of the motor vehicle.

68 designates a line connected to the brush 64 and the battery 67. 69 designates an indicator such as an ammeter, excepting that it is preferably calibrated to register the pressure of the air within the tire 6. The poles of the indicator 69 are connected to the line 68, which latter is equipped with a switch 70. The brush 62 is connected to the wire conductor 58 and a wire conductor 72 which are connected to the contact 18 and the conductor 68, respectively.

The operation of the appliance so far as described, is as follows: When the switch 70 is closed current flows from the positive pole of the battery 67 through line 66, brush 63, ring 54, wire 58, contact 18, plate 20, and returns to the battery 67 through wire 60, ring 56, brush 64, line 68 and indicator 69, and the switch 70. At the same time the solenoid 44 is energized by current flowing through the line 66, wire 58, solenoid 44, ring 52, brush 62, wire 72, and the line 68. As the solenoid 44 is energized it attracts its core 46 inwardly, causing the latter to open the valve 10 and thereby permitting air from the tire 6 to flow into the Bourdon tube 12 through the valve structures 8 and 26 and the flexible tube 22. As the air enters the Bourdon tube 12, it, in accordance with the pressure at which it flows from the tire 6, extends said tube and thereby causes the contact 18 to move over the plate 20 towards the line 60 and cut out a proportionate amount of resistance offered by said plate 20. Thus the strength of the current flowing through the indicator 69 is responsive to variations of pressure within the tire and such variations accordingly can be read on said indicator 69.

In practice the four wheels of the motor vehicle are equipped alike and four indicators are also preferably provided so that when the switch 70 is closed the air pressure within the tires will be simultaneously indicated. The indicators are preferably mounted upon the dash and so positioned or numbered as to indicate the respective tires to which they are connected so that the driver may, on closing the switch 70, instantly know which tire, if any, requires additional inflation.

The complete circuits and directions of current flow are shown by Fig. 5, in which a number of similar parts bear corresponding reference numerals with exponents "a", "b" and "c", and since the operation of the parts similarly numbered but without said exponents has been fully set forth, further description is deemed unnecessary.

In the modified form disclosed by Fig. 6, a bellows-shaped spring tube $12^a$ is substituted for the Bourdon tube 12. Said tube $12^a$ has contacts $18^d$ and 19 at its opposite ends which are emersed in a liquid conductor $20^d$. One end of the tube $12^a$ is anchored as indicated at 23 while its opposite end is free to move back and forth according to the pressure of the air admitted against the exterior of said free end. The free end of the tube $12^a$ may be connected by a rubber tube $22^a$ with the shell nipple 24, while the contacts $18^d$ and 19 may be connected to the rings 54 and 56 through the intermediary of wires $58^d$ and $60^d$, respectively. As pressure is applied to the free end of the tube $12^a$ the contact $18^d$ is carried towards the contact 19 so that the resistance offered by the liquid $20^a$ to the flow of current will be accordingly reduced.

When the tire is to be inflated it is only necessary to remove the cap 36, and when the tire is to be removed from the wheel it is only necessary to disconnect the coupling 28 from the valve structure 8, so that the latter can be withdrawn from the usual opening in the wheel rim.

While I have shown a specific embodiment of my invention and a modification of the spring tube, it will be apparent to those skilled in the art that other changes in the construction, combination and arrangement of parts may be made without departure from the spirit and scope of the invention, and I accordingly reserve the right to all such changes and modifications as properly fall within the spirit and scope of the invention as claimed.

Having thus described my invention, what I claim and desire to secure by Letters Patent, is:

1. In combination with a vehicle wheel having an inflatable tire provided with a valve, a shell connected to said valve and having a passageway extending therethrough, a self-closing valve for normally closing the outer end of said passageway, a curved resilient tube closed at one end and communicating at its opposite end with the passageway, a resistance in contact with the said tube, electrically controlled means for opening the tire valve to permit air to flow from the tire into said resilient tube and move the latter over said resistance, an electrical indicator visible from the driver's position for indicating the pressure of the air and electrically connected to said resistance, and a circuit controllable from the driver's position for energizing said valve opening means and said pressure indicator.

2. In combination with a vehicle wheel having an inflatable tire mounted thereon, a spring tube communicating with the interior of and responsive to pressure variations within the tire, an electrical instrument visible from the driver's position for indicating said pressure variations, a variable resistance controlled by said tube, a valve for controlling communication between the tire and said tube, electrically controlled means for actuating said valve, a circuit including said pressure indicating instrument, the resistance and the valve controlling means, and means controllable from the driver's position for opening and closing said circuit.

3. In combination with a vehicle wheel having an inflatable tire provided with a valve, means connected with said valve and responsive to pressure variations within the tire, a case enclosing said means and secured to the wheel, a variable resistance controlled by said means, electrically controlled means for opening the valve to permit air from the tire to actuate the first mentioned means, electrical means visible from the driver's position for indicating the pressure of the air, and a circuit controllable from the driver's position and including said resistance, the means for opening the valve and the pressure indicating means.

4. In combination with a vehicle wheel having an inflatable tire provided with a valve, a shell connected to said valve, means connected to said shell and responsive to pressure variations within the tire, a variable resistance controlled by said means, magnetic means for opening the valve to permit air from the tire to actuate the first-mentioned means, an electrical pressure indicator visible from the driver's seat for indicating the pressure of the air, and a circuit controllable from the driver's position and including said resistance, the means for opening the valve and the pressure indicator.

5. In combination with a vehicle wheel having an inflatable tire provided with a self-closing valve for admitting air under pressure to the tire, a shell provided with a valve controlled passageway leading from said self-closing valve, resilient means connected with said shell and responsive to pressure variations within the tire, a solenoid mounted within the shell for opening the self-closing valve to permit air from the tire to act upon said pressure responsive means, an electrical air pressure indicator visible from the driver's position, a variable resistance controlled by the pressure responsive means for regulating the flow of an electric current to said air pressure indicator, and a circuit controllable from the driver's position and including said resistance, the solenoid and the pressure indicating means.

In testimony whereof I affix my signature.

HOWARD S. CRAWFORD.